United States Patent [19]

Schwarcz et al.

[11] 3,945,974

[45] Mar. 23, 1976

[54] SMOKE SUPPRESSANTS FOR HALOGEN-CONTAINING PLASTIC COMPOSITIONS

[75] Inventors: Joseph Schwarcz, Highland Park; Bernard Engelbart, Trenton; Edward L. White, Freehold, all of N.J.

[73] Assignee: N L Industries, Inc., New York, N.Y.

[22] Filed: Dec. 20, 1973

[21] Appl. No.: 426,492

[52] U.S. Cl. 260/31.8 R; 260/45.7 R; 260/45.75 W; 260/45.75 B
[51] Int. Cl.² .............................................. C08J 3/20
[58] Field of Search . 260/45.75 R, 45.7 R, 45.75 B, 260/45.75 W, 45.75 K, 29.1 R

[56] References Cited
UNITED STATES PATENTS

| | | | |
|---|---|---|---|
| 2,772,159 | 11/1956 | Elliott | 260/45.75 |
| 2,855,266 | 10/1958 | James | 260/45.75 |
| 2,948,638 | 8/1960 | Baird | 260/45.75 |
| 3,202,567 | 8/1965 | Muri et al. | 106/15 FP |
| 3,705,128 | 12/1972 | Knowles | 260/45.75 |
| 3,766,157 | 10/1973 | Parts | 260/45.75 |
| 3,770,577 | 11/1973 | Humpbrey | 260/45.75 |

OTHER PUBLICATIONS

Journal of the American Chemical Society Vol. 61, No. 12 pp. 3241 to 3244 Dec. 19, 1939.

*Primary Examiner*—V. P. Hoke

[57] ABSTRACT

Zinc is added to a halogen-containing plastic composition with or without a flame retardant additive to serve as a smoke suppressant during combustion of the plastic.

16 Claims, No Drawings

SMOKE SUPPRESSANTS FOR HALOGEN-CONTAINING PLASTIC COMPOSITIONS

BACKGROUND OF INVENTION

Plastic materials including plastic sheeting, synthetic fibers and the like are generally considered to be hazardous materials from the standpoint of flammability; and in many cases it is the practice to add various flame retardants to the plastic materials to reduce flammability during combustion. Recently, however, the propensity of plastics to create large volumes of smoke, when combusted, has come to be regarded as at least as hazardous, if not more so, than its flammability. Increasing concern with consumer safety and several tragic accidents have contributed to the recognition of smoke evolution as a significant hazard. In many instances of fire, the resulting fatalities have been due to smoke which has prevented safe evacuation of a building due to lack of visibility; or to the toxic gases generated during combustion of the plastic.

As mentioned above, extensive studies have been made in the area of flame-retardant additives for halogen-containing plastic compositions examples of which are antimony trioxide; antimony pentaoxide, antimony-silico oxide see U.S. Pat. No. 3,740,245 and other organic and said antimony-silco oxide comprising amorphous materials prepared by reacting antimony trioxide ($Sb_2O_3$) with hydrous silica or hydrous alkali or alkaline earth metal silicates in weight ratio range 1:4 to 1:1 at temperatures in the range 400°–550°C in an oxygen containing atmosphere; the specific gravity of the antimony-silico compounds being in the range 2.4 – 3.6 and having an index of refraction of from 1.5 to 1.7, inorganic compositions of antimony. Zinc borate has been used also as a flame retardant but so far as is known never as a smoke suppressant and always at relatively high levels as for example from 3 to 8 parts per 100 parts resin since lesser amounts are ineffective as a flame retardant. Moreover, the concept of suppressing smoke as well as retarding flammability is disclosed in U.S. Pat. No. 3,723,139 Larkin et al who disclose the addition of antimony oxide in combination with sodium antimonate to polyvinyl chloride plastics both to minimize flammability and to suppress smoking.

It is desirable, however, to provide a smoke suppressant for halogen-containing polymer compositions which may be used alone and preferably in combination with flame retardants and which are more effective than smoke suppressants heretofore known and used.

SUMMARY OF INVENTION

The present invention is the discovery that zinc in substantially any form which can generate zinc oxide during the combustion of the polymer, i.e. zinc dust, and inorganic or organic compounds of zinc, and in amounts at extremely low levels as for example in the range of about 0.5 to 1.00 parts per hundred parts resin, as zinc oxide, is a superior smoke suppressant for many halogen-containing polymer compositions including polyvinyl chloride, ABS and halogenated unsaturated polyesters and the like; and that the zinc is effective whether added alone or in combination with a flame retardant additive. The zinc additives which have been found to be effective as smoke suppressants when incorporated in halogen-containing polymer compositions and in particular plasticized polyvinyl chloride include zinc dust, zinc oxide, zinc carbonate, normal zinc trimellitate, acid zinc trimellitate, zinc borate, zinc benzoate, zinc caprate, zinc fumarate, tribasic zinc phosphite, tribasic zinc sulfate-silicate, pentabasic zinc sulfate, tribasic zinc phosphate, dibasic zinc phosphate, pentadecabasic zinc sulfate, tetrabasic zinc sulfate-silicate, tribasic zinc trimellitate, heptabasic zinc trimellitate and decabasic zinc trimellitate.

The zinc dust and all of the foregoing zinc compounds were tested for smoke suppression effect in halogen-containing polymer compositions, the smoke suppression evaluation being made using the National Bureau of Standards Smoke Test hereinafter described.

The incorporation of the zinc or zinc compounds into the halogen-containing plastic compositions is effected by blending the zinc or zinc compounds with the components used in formulating the plastic compositions.

PREFERRED EMBODIMENT OF INVENTION

The instant invention comprehends the addition of zinc or a zinc compound to a halogen-containing polymer composition. While it has been discovered that zinc or any zinc compound is an effective smoke suppressant in halogen containing polymer compositions the degree of smoke suppression is not always the same, some zinc materials being more effective than others. In addition to the smoke suppressant effectiveness of these zinc materials they may have other effects in polymer compositions which effects are known to the art as for example some zinc compounds may have an adverse effect on heat stability, some zinc compounds are hygroscopic, deliquescent, unstable or corrosive and some may have a beneficial effect on flame retardancy. Therefore, in selecting a preferred zinc compound to be used in a specific polymer composition besides the smoke suppressant efficiency of the zinc other considerations such as cost and those mentioned above must be taken into account. In light of these considerations the preferred zinc compound used in a specific polymer composition may not necessarily be the most effective smoke suppressant but one combining smoke suppressancy with minimum degradation, maximum flame retardancy, minimum cost etc. As an example, those zinc compounds which exhibit optimum smoke suppression in plasticized PVC are zinc oxide, zinc benzoate, zinc caprate, zinc metaborate and tribasic zinc phosphite. However, these have an adverse effect on heat stability and hence require the addition of heat stabilizers which is an added expense in the total cost of the polymer composition. Examples of zinc additives which require little or no heat stabilizer additives and for this reason are preferred over the foresaid zinc compounds, even though somewhat less effective as smoke suppressants, are zinc carbonate, zinc dust, acid zinc trimellitate, normal zinc trimellitate, zinc fumarate, dibasic zinc fumarate, and zinc peroxide.

It will be understood, however, that the zinc compounds listed above are not restrictive but that other zinc compounds, inorganic, organic or organo-metallic which can generate zinc oxide during combustion in intimate mixture with halogen containing polymer compositions are contemplated within the scope of this invention.

The instant invention is thus concerned with halogen-containing polymer compositions containing zinc or a compound of zinc as a smoke suppressant, and preferably with a flame retardant, the invention being directed particularly to plasticized polyvinyl chloride in the form of flexible sheeting, wire insulation, powders, massive forms and the like which contain antimony-base flame retardant additives.

Preparation of these halogen-containing polymer compositions is effected by standard methods and standard equipment in the art, the amount of zinc added, being in the range of from 0.5 to 1.0 parts per 100 parts resin expressed in ZnO.

A typical polyvinyl chloride formulation containing zinc as a smoke suppressant is as follows:

| | |
|---|---|
| PVC resin — Geon 102 EPF5 (B.F. Goodrich Co.) | — 100 parts |
| Clarite NS-2 (modified dibutyltin maleate stabilizer) | — 1.5 parts |
| Dioctyl phthalate | — 50 parts |
| Antimony trioxide (flame retardant) | — 3.0 parts |
| Zinc Additive (expressed as ZnO) 0.5 | — 1.0 parts |

SMOKE TEST

The smoke suppressant capabilities of the zinc or zinc compounds used in test specimens of plasticized halogen-containing polymer compositions was tested using the National Bureau of Standards (NBS) Smoke Density Chamber a detailed description of which is given in a paper entitled "Method for Measuring Smoke from Burning Material" by D. Gross, J. J. Loftus and A. F. Robinsion — in Symposium on Fire Test Methods — Restraint of Smoke 1966 ASTM STP422. American Society Testing Materials 1967 p. 166.

According to the NBS method smoke is measured by optical means wherein a collimated vertical light beam passes through the chamber and the variation intensity of the light beam, resulting from the density of the smoke in the chamer, is measured by a photometer. A comparison between the smoke behavior of two samples, of identical dimensions, is based on the corrected (for soot deposition) maximum specific smoke density Dm the term Dm being used in the sense defined by NBS. The specimen producing the lowest Dm will be the superior specimen.

The following examples will further illustrate the novel aspects of the instant invention.

EXAMPLES 1–10

Eleven test specimens were prepared in which zinc and various compounds of zinc were added at a constant level of 0.5 PHR (as ZnO) to a plasticized polyvinyl chloride formulation having the composition given above. Each test specimen was prepared from a 40 mil sheet of flexible PVC and was tested under nonflaming conditions in the NBS Smoke Chamber. The DM values are shown in Table I.

TABLE I

ZINC COMPOUNDS AS SMOKE SUPPRESSANTS IN FLEXIBLE PVC INCLUDING ANTIMONY TRIOXIDE FLAME RETARDANT

| Example | Additive | Additive PHR | Zinc(as ZnO) PHR | Dm |
|---|---|---|---|---|
| 1 | None | | | 461 |
| 2 | ZnO | 0.5 | 0.5 | 336 |
| 3 | Zn dust | 0.4 | 0.5 | 407 |
| 4 | Zn Carbonate | 0.69 | 0.5 | 411 |
| 5 | Normal Zn TriMT* | 1.51 | 0.5 | 375 |
| 6 | Acid Zn TriMT* | 2.02 | 0.5 | 445 |
| 7 | Zn Borate | 1.31 | 0.5 | 349 |
| 8 | Zn Benzoate | 1.92 | 0.5 | 327 |
| 9 | Zn Caprate | 2.55 | | 378 |
| 10 | Zn Fumarate | 1.13 | 0.5 | 432 |

*Trimellitate

As shown in the data in Table I above, a polyvinyl chloride plastic material containing no zinc had a maximum specific smoke density Dm of 461. In contradistinction all of those tested specimens which contained zinc or zinc dust, or inorganic or organic zinc compounds, had Dm values which were significantly lower than the test specimen containing no zinc.

EXAMPLES 11–31

Additional test specimens were prepared using the procedure described above in which the zinc additive was, in all instances, at a concentration of 0.75 PHR (as ZnO). The identity of the zinc additives and the corresponding Dm values are shown in the Table below.

TABLE II

ZINC COMPOUNDS AS SMOKE SUPPRESSANTS IN FLEXIBLE PVC INCLUDING ANTIMONY TRIOXIDE FLAME RETARDANT

| Example | Additive | Additive PHR | Zinc(as ZnO) PHR | Dm |
|---|---|---|---|---|
| 11 | None | — | — | 454 |
| 12 | Zinc Oxide | 0.75 | 0.75 | 286 |
| 13 | Tribasic zinc phosphite | 1.12 | 0.75 | 327 |
| 14 | Tribasic zinc sulfate-silicate | 2.10 | 0.75 | 306 |
| 15 | Pentabasic zinc sulfate | 1.09 | 0.75 | 316 |
| 16 | Tribasic zinc phosphate | 1.12 | 0.75 | 361 |
| 17 | Decabasic zinc sulfate | 1.02 | 0.75 | 280 |
| 18 | Pentadecabasic zinc sulfate | 0.99 | 0.75 | 336 |
| 19 | Tetrabasic zinc sulfate-silicate | 2.06 | 0.75 | 276 |
| 20 | Acid zinc trimellitate | 3.04 | 0.75 | 406 |
| 21 | Normal zinc trimellitate | 2.27 | 0.75 | 295 |
| 22 | Tribasic zinc trimellitate | 1.83 | 0.75 | 300 |
| 23 | Heptabasic zinc trimellitate | 1.49 | 0.75 | 288 |
| 24 | Decabasic zinc trimellitate | 1.39 | 0.75 | 285 |
| 25 | Zinc fumarate | 1.66 | 0.75 | 376 |
| 26 | Zinc carbonate | 1.04 | 0.75 | 324 |
| 27 | 3/2 Tetrabasic Zinc Sulfate/Tribasic Zinc Phosphite | 1.01 | 0.75 | 311 |
| 28 | 1/1 Tetrabasic Zinc Sulfate/Tribasic Zinc Phosphite | 1.01 | 0.75 | 295 |
| 29 | 3/2 Tribasic Zinc Phosphite/Tetrabasic Zinc Sulfate | 1.00 | 0.75 | 330 |
| 30 | Dibasic Zinc Sulfate | 1.01 | 0.75 | 297 |
| 31 | Zinc Peroxide | 0.85 | 0.75 | 325 |

As will be seen from the data in Table II, in every instance, the test specimens containing zinc had Dm values well below the test specimen containing no zinc.

EXAMPLES 32–38

Another series of tests were conducted using the same polyvinyl chloride formulation identified above except that the flame retardant compound was an antimony-silico composition (A-S) instead of antimony trioxide. The test specimens were again prepared from 40 mil sheeting. In this series of tests a comparison was made between the effect of zinc oxide and zinc borate, either alone or in combination with the (A-S) flame retardant the zinc concentration being constant at 0.75 PHR as zinc oxide for each specimen. The results of the tests are shown in Table III below.

TABLE III

ZINC COMPOUNDS AS SMOKE SUPPRESSANTS IN FLEXIBLE PVC WITH OR WITHOUT (A-S) FLAME RETARDANT

| Example | Additive | Concentration Additive PHR | Zinc(as ZnO) PHR | Dm | Oxygen Index (O.I) |
|---|---|---|---|---|---|
| 32 | None | — | — | 460 | 24.9 |
| 33 | (A-S) | 6.0 | — | 412 | 28.6 |
| 34 | ZnO | 0.75 | 0.75 | 235 | 25.4 |
| 35 | Zinc borate (37.3% ZnO, 48.1% $B_2O_3$) | 2.01 | 0.75 | 225 | 26.4 |
| 36 | (A-S) + ZnO | 6/0.75 | 0.75 | 215 | 28.3 |
| 37 | A-S-Z | 6 | 0.75 | 230 | 26.2 |
| 38 | (A-S) + Zinc borate | 6/2.01 | 0.75 | 258 | 28.1 |

Reference to Table III will show that a polyvinyl chloride plastic material containing neither a flame retardant nor a smoke suppressant had a smoke density Dm of 460 which is equivalent to saying that the test material, when burning, evolved considerable smoke. By adding the (A-S) flame retardant the Dm value of the plastic was reduced somewhat (412); but when a zinc compound was added, i.e. zinc oxide at 0.75 parts per 100 parts resin the Dm value of the plastic dropped to 285. Similarly when zinc borate was used in an amount 0.75 PHR, as ZnO, and when either zinc oxide or zinc borate was used in combination with the (A-S) flame retardant Dm values were extremely low. Further, it has been found that zinc compounds are equally effective as smoke suppressants when the smoke suppressant, i.e. zinc compound and the flame retardant is a simple mechanical mixture, such as A-S+ZnO or A-S + zinc borate (Examples 36 and 38); or when the zinc is added in the form of a complex calcined compound (A-S-Z) as in 37. In this connection, tests have shown that although uncalcined zinc is a highly effective smoke suppressant it has an adverse effect on the heat stability of the polymer composition; but that, in general, calcination tends to decrease this adverse effect. In all instances, the Dm values were extremely low indicating that the smoking characteristics of the burning plastic had been considerably reduced.

EXAMPLES 39–45

In order to illustrate the superior smoke suppressant properties of PVC formulations containing zinc as compared to PVC formulations containing prior art smoke suppressant, as described, for example, in U.S. Pat. No. 3,723,139 issued Mar. 27, 1973 a series of tests were made using PVC test strips prepared according to the formulation given above except that compounds other than zinc were added as smoke suppressants. The Dm value of the test strips are shown in Table IV below.

TABLE IV

COMPARISON BETWEEN PVC POLYMER CONTAINING SMOKE SUPPRESSANT OF PRIOR ART AND ZINC

| Example | Additive | Concentration Additive PHR | Zinc(as ZnO) PHR | Dm |
|---|---|---|---|---|
| 39 | (none) | — | — | 462 |
| 40 | Sodium antimonate + MgO | 1.13 | — | 440 |
| 41 | Magnesium Oxide | 0.38 | — | 411 |
| 42 | Antimony-silico-zinc complex (A-S-Z) | 6 | 0.75 | 314 |
| 43 | Aluminum hydroxide | 9.2 | — | 392 |
| 44 | Aluminum hydroxide plus ZnO | 9.95 | 0.75 | 246 |
| 45 | Zinc oxide | 0.75 | 0.75 | 285 |

From the foregoing tests it is clear that sodium antimonate plus magnesium oxide alone and aluminum hydroxide alone are relatively poor smoke suppressants as compared to the zinc compounds. It is interesting to note also that aluminum hydroxide alone is a poor smoke suppressant — but when combined with zinc oxide the resulting complex has a lower Dm value than either component alone — which suggests a synergistic effect on smoke suppression.

EXAMPLES 46–52

Seven additional test specimens were made using the same polyvinyl chloride formulation and the same size test strips as described in Examples 1–10 above except that (A-S) was substituted for antimony trioxide, and the amount of zinc oxide used, with or without (A-S) as flame retardant, was varied - the mixture of zinc oxide and flame retardant being uncalcined.

TABLE V

SMOKING CHARACTERISTICS OF PVC COMPOSITIONS CONTAINING ZINC OXIDE AND (A-S)

| Examples | Concentration Additive (A-S) PHR | Zinc Oxide PHR | Dm |
|---|---|---|---|
| 46 | (None) | (None) | 455 |
| 47 | 6 | 0 | 412 |
| 48 | 6 | 0.25 | 302 |
| 49 | 6 | 0.50 | 286 |
| 50 | 6 | 0.75 | 215 |
| 51 | 6 | 0.90 | 256 |
| 52 | 0 | 0.75 | 235 |

The data in the foregoing Table shows clearly that a polyvinyl chloride plastic material containing neither a flame retardant nor smoke suppressant (Example 46)

had a relatively high maximum specific smoke density (DM); that when the (A-S) flame retardant was used alone in an amount of 6 PHR the Dm value of the plastic material was slightly reduced. However, when zinc was added, as zinc oxide, in amounts ranging from 0.25 to 0.90 parts per 100 parts resin, the Dm values of the polyvinyl chloride test strips were significantly lowered again showing that zinc is a powerful smoke suppressant in polyvinyl chloride formulations at the indicated low concentration levels.

EXAMPLES 53–54

Additional test strips were made to show the effectiveness of zinc as smoke suppressant in rigid PVC, i.e. no plasticizer present. The basic formulation, as given above, was modified by eliminating DOP and antimony oxide. A lubricant, 0.25 PHR stearic acid, was added. As shown in Table VI below, the zinc oxide addition acted as an effective smoke suppressant in the rigid PVC test strips.

TABLE VI

ZINC OXIDE AS SMOKE SUPPRESSANT IN RIGID PVC

| Example | Additive | Concentration (PHR) | Dm |
|---|---|---|---|
| 53 | none | — | 100 |
| 54 | Zinc Oxide | 0.75 | 87 |

EXAMPLES 55–62

In order to show the effectiveness of zinc or zinc compounds as smoke suppressant in polymers other than PVC, a series of test strips were prepared from ABS, chlorinated polyethylene and polyester using the formulations set out below the test strips of ABS and chlorinated polyethylene having a thickness of 40 mils and those of the polyester having a thickness of 125 mils the latter being cured with methyl ethyl ketone peroxide at 82°C for 2 hours.

ABS FORMULATION

| | | |
|---|---|---|
| Acrylonitrile-Butadiene-Styrene Polymer | 100 | parts |
| Calcium Stearate | 1 | " |
| Bromine-Chlorine (fire retardant) | 10 | " |
| Pentabromophenyl alkyl ether | 10 | " |
| Zinc additive (as indicated) | | |

CHLORINATED POLYETHYLENE

| | | |
|---|---|---|
| Chlorinated Polyethylene (42% chlorine) | 100 | parts |
| Calcium Stearate | 1 | " |
| Clarite NS-2 (modified dibutyltin maleate stabilizer) | 1.5 | parts |
| Zinc additive (as indicated) | | |

POLYESTER

| | | |
|---|---|---|
| Halogenated polyester | 50 | parts |
| Non-halogenated polyester | 50 | " |
| Additive (as indicated) | | |

The results are shown in the Table below:

TABLE VII

ZINC COMPOUNDS AS SMOKE SUPPRESSANTS IN ABS, CHLORINATED POLYETHYLENE (CPE) AND POLYESTER

| Example | Additive | Zn(as ZnO) Concentrate PHR | PHR | Dm |
|---|---|---|---|---|
| ABS | | | | |
| 55 | none | — | — | 311 |
| 56 | A-S-Z | 10 | 1.25 | 273 |
| CPE | | | | |
| 57 | none | — | — | 275 |
| 58 | ZnO | 0.75 | 0.75 | 259 |
| POLYESTER | | | | |
| 59 | none | — | — | 668 |
| 60 | A-S-Z | 12 | 1.50 | 636 |
| 61 | $Sb_2O_3$ | 6 | — | 742 |
| 62 | $Sb_2O_3$+A-S-Z | 8 | 0.5 | 686 |

In each instance the addition of zinc to the halogen-containing polymer effected a significant reduction in smoke evolution.

The above data demonstrate clearly the superior smoke suppression properties of zinc or zinc compounds either alone or in admixture with an antimony-type flame retardant such as used in halogen-containing polymer compositions and in particular polyvinyl chloride — as compared to polyvinyl chloride formulations containing only an antimony-type flame retardant or a combination of antimony oxide and sodium antimonate. And further, that certain zinc additions and in particular, acid, normal and basic zinc trimellitates, zinc dust, zinc carbonate, and normal and basic zinc fumarates, combine good smoke suppresant properties with minimum effect on degradation of the plastic.

The invention may be carried out in other specific ways than those herein set forth without departing from the spirit and essential characteristics of the invention, and the present embodiments are therefore to be considered in all respects as illustrative and not restrictive, and all changes coming within the meaning and equivalency range of the appended claims are intended to be embraced therein.

What is claimed is:

1. Method for forming a smoke suppressing combustible polyvinyl chloride composition comprising a polyvinyl chloride resin, a stabilizer, and zinc oxide comprising the steps of adding zinc oxide to the components of said polyvinyl chloride composition during formulation thereof, said zinc oxide added in amounts in the range of from about 0.2 to no more than about 1.0 part per 100 parts polymer resin.

2. Method for forming a smoke suppressing combustible polyvinyl chloride composition comprising adding finely divided zinc metal to the components of said polyvinyl chloride composition during formulation thereof said finely divided zinc metal added in amounts in the ranges of from about 0.2 to no more than about 1.0 part calculated as zinc oxide per 100 parts plymer resin.

3. Method for forming a smoke suppressing combustible polyvinyl chloride composition comprising a polyvinyl chloride resin, a stabilizer, a plasticizer, a flame retardant and zinc oxide comprising the steps of adding zinc oxide to the components of said polyvinyl chloride composition during formulation thereof said zinc oxide added in amounts in the range of from about 0.2 to no more than about 1.0 part per 100 parts polymer resin.

4. Method according to claim 3 wherein said flame retardant is a compound of antimony.

5. Method according to claim 4 wherein said compound of antimony comprises antimony trioxide.

6. Method according to claim 4 wherein said compound of antimony is an antimony-silico compound.

7. Method according to claim 4 wherein said compound of antimony is a calcined complex of an antimony-silico compound and zinc.

8. Method for forming a smoke suppressing combustible polyvinyl chloride composition comprising adding powdered zinc metal in combination with a flame retardant to the components of said polyvinyl chloride composition during formulation thereof said zinc metal added in amounts in the range of from about 0.2 to no more than about 1.0 part calculated as zinc oxide per 100 parts polymer resin.

9. A smoke suppressing combustible polyvinyl chloride composition comprising a vinyl chloride polymer, a stabilizer, and a smoke suppressant said smoke suppressant comprising zinc oxide in an amount in the range of from about 0.2 to no more than about 1.0 part per 100 parts polymer resin.

10. A smoke suppressing combustible polyvinyl chloride composition according to claim 9 wherein said polymer composition includes a plastitizer and a flame retardant additive said additive comprising a compound of antimony.

11. A smoke suppressing combustible polyvinyl chloride composition according to claim 10 wherein said compound of antimony is antimony trioxide.

12. A smoke suppressing combustible polyvinyl chloride composition according to claim 10 wherein said compound of antimony is an antimony-silico compound.

13. A smoke suppressing combustible polyvinyl chloride composition comprising a vinyl chloride polymer having a smoke suppressant incorporated therein said smoke suppressant comprising zinc dust added in amounts in the range from about 0.2 to no more than about 1.0 part, calculated as zinc oxide, per 100 parts polymer resin.

14. A smoke suppressing combustible polyvinyl chloride composition according to claim 13 wherein said compound of antimony is an antimony-silico compound.

15. Method for forming a smoke suppressing combustible acrylonitrile-butadiene-styrene polymer containing an organic halide flame retardant comprising: adding zinc oxide to the components of said polymer during formulation thereof said zinc oxide added in amounts in the range of from about 0.2 to no more than about 1.0 part per 100 parts polymer resin.

16. Method for forming a smoke suppressing combustible polyester containing an organic halide flame retardant comprising: adding zinc oxide to the components of said polyester during formulation thereof said zinc oxide added in amounts in the range of from about 0.2 to no more than about 1.0 part per 100 parts resin.

* * * * *